(12) United States Patent
Nasradini et al.

(10) Patent No.: US 10,632,629 B2
(45) Date of Patent: Apr. 28, 2020

(54) CABLE DEVICE OF AN INDUSTRIAL ROBOT

(71) Applicant: KUKA Deutschland GmbH, Augsburg (DE)

(72) Inventors: Melina Nasradini, Augsburg (DE); Vladimir Kurmyshkin, Gersthofen (DE); Stefan Karlinger, Augsburg (DE); Jürgen Heitz, Westendorf (DE); Frank Rohé, Gersthofen (DE)

(73) Assignee: KUKA Deutschland GmbH, Augsburg (DE)

( * ) Notice: Subject to any disclaimer, the term of this patent is extended or adjusted under 35 U.S.C. 154(b) by 159 days.

(21) Appl. No.: 15/579,686

(22) PCT Filed: Jun. 9, 2016

(86) PCT No.: PCT/EP2016/063128
§ 371 (c)(1),
(2) Date: Dec. 5, 2017

(87) PCT Pub. No.: WO2016/198509
PCT Pub. Date: Dec. 15, 2016

(65) Prior Publication Data
US 2018/0169871 A1    Jun. 21, 2018

(30) Foreign Application Priority Data
Jun. 9, 2015   (DE) .................. 10 2015 210 570

(51) Int. Cl.
*B25J 19/00*       (2006.01)
*H02G 3/04*       (2006.01)
(Continued)

(52) U.S. Cl.
CPC ............ *B25J 19/0025* (2013.01); *B25J 9/06* (2013.01); *B25J 9/16* (2013.01); *B65H 57/12* (2013.01);
(Continued)

(58) Field of Classification Search
CPC .. B25J 19/0025; B25J 19/0029; H02G 3/0475
See application file for complete search history.

(56) References Cited

U.S. PATENT DOCUMENTS

| | | | | |
|---|---|---|---|---|
| 4,582,281 A | * | 4/1986 | Van Camp | B25J 9/06 248/49 |
| 4,615,101 A | * | 10/1986 | Edwards | B23B 31/265 279/4.09 |

(Continued)

FOREIGN PATENT DOCUMENTS

| | | |
|---|---|---|
| DE | 20112491 U1 | 10/2001 |
| DE | 102004028577 A1 | 12/2005 |

(Continued)

OTHER PUBLICATIONS

Leoni, Device for guiding a tube having a supply line [. . . ], 2007, Machine translation of Applicant cited and submitted reference DE202004021177 (Year: 2007).*

(Continued)

*Primary Examiner* — William Kelleher
*Assistant Examiner* — Gregory T Prather
(74) *Attorney, Agent, or Firm* — Dorton & Willis, LLP

(57) ABSTRACT

A cable guide device for guiding at least one supply cable along a robot arm includes a supply cable and a spring system configured to automatically return the supply cable from an extracted state into a retracted state. The device, has a front end section in the direction of extraction of the supply cable, and a rear end section in the direction of extraction of the supply cable. The device further includes a spring system (Continued)

seat permanently connected to the supply cable and on which the rear end section of the spring system is mounted, an abutment seat on which the front end section of the spring system is mounted, a fastening device configured to fasten the cable guide device to a link of the robot arm, and an adjustment device carrying the abutment seat and configured to mount the abutment seat for movement with respect to the fastening device.

12 Claims, 4 Drawing Sheets

(51) Int. Cl.
  *B25J 9/06* (2006.01)
  *B25J 9/16* (2006.01)
  *B65H 57/12* (2006.01)
  *B65H 75/00* (2006.01)
  *B65H 79/00* (2006.01)

(52) U.S. Cl.
  CPC ............ *B65H 75/00* (2013.01); *B65H 79/00* (2013.01); *H02G 3/0468* (2013.01); *Y10S 901/02* (2013.01); *Y10S 901/15* (2013.01)

(56) References Cited

U.S. PATENT DOCUMENTS

| | | | | |
|---|---|---|---|---|
| 4,705,243 A * | 11/1987 | Hartmann | ............ | B23K 11/362 248/160 |
| 6,230,859 B1 * | 5/2001 | Springmann | ........ | B25J 19/0025 191/12 R |
| 6,288,512 B1 * | 9/2001 | Berninger | ............ | B25J 19/0025 191/12 R |
| 6,471,189 B2 * | 10/2002 | Karlinger | ............. | B25J 19/0025 254/329 |
| 6,588,295 B1 * | 7/2003 | Salomonsson | ....... | B25J 19/0025 242/615.3 |
| 6,684,731 B1 * | 2/2004 | Karlinger | ............. | B25J 19/0025 248/51 |
| 6,734,367 B2 * | 5/2004 | Haniya | ................ | B25J 19/0025 174/135 |
| 6,811,124 B2 * | 11/2004 | Karlinger | ............. | B25J 19/0025 248/49 |
| 7,173,213 B2 * | 2/2007 | Inoue | ................... | B23K 9/1336 219/125.1 |
| 7,320,264 B2 * | 1/2008 | Albertsson | ........... | B25J 19/0025 414/680 |
| 7,790,984 B2 * | 9/2010 | Choi | .................... | B25J 19/0025 174/135 |
| 7,806,019 B2 * | 10/2010 | Iwai | ...................... | B25J 19/0025 414/918 |
| 7,810,765 B2 * | 10/2010 | Burlot | .................. | B25J 19/0025 248/75 |
| 7,959,399 B2 * | 6/2011 | Horning | ............... | B25J 15/0616 414/729 |
| 8,020,467 B2 * | 9/2011 | Haniya | ................ | B25J 19/0025 74/490.02 |
| 8,051,741 B2 * | 11/2011 | Inoue | ................... | B25J 19/0025 74/490.01 |
| 8,117,939 B2 * | 2/2012 | Burlot | .................. | B25J 19/0025 74/490.02 |
| 8,201,473 B2 * | 6/2012 | Knoll | .................. | A61B 1/00156 74/490.05 |
| 8,371,189 B2 * | 2/2013 | Ibayashi | .............. | B25J 19/0025 74/490.02 |
| 8,893,577 B2 * | 11/2014 | Ibayashi | .............. | B25J 19/0025 74/490.02 |
| 8,944,389 B2 * | 2/2015 | Neuber | ................ | B25J 19/0025 248/75 |
| 9,238,556 B2 * | 1/2016 | Kuhn | ........................ | B21J 15/32 |
| 9,289,902 B2 * | 3/2016 | Gro.beta. | .................. | A61B 6/56 |
| 9,713,902 B2 * | 7/2017 | Susnjara | ................ | B29C 64/106 |
| 10,259,126 B1 * | 4/2019 | Kapczynski | ............. | F16L 3/18 |
| 10,384,292 B2 * | 8/2019 | Lizotte | ................... | B23K 9/125 |

FOREIGN PATENT DOCUMENTS

| | | |
|---|---|---|
| DE | 202004021177 U1 | 4/2007 |
| DE | 102006028145 A1 | 12/2007 |
| DE | 102009056454 A1 | 6/2011 |
| DE | 202011004786 U1 | 7/2011 |
| DE | 102014200870 A1 | 7/2014 |
| EP | 1369211 A1 | 12/2003 |
| EP | 2392436 A1 | 12/2011 |

OTHER PUBLICATIONS

German Patent Office; Office Action in related German Patent Application No. 10 2015 210 570.9 dated Mar. 21, 2016; 5 pages.
European Patent Office; Search Report and Written Opinion in related International Patent Application No. PCT/EP2016/063128 dated Aug. 8, 2016; 10 pages.

* cited by examiner

CABLE DEVICE OF AN INDUSTRIAL ROBOT

CROSS-REFERENCE

This application is a national phase application under 35 U.S.C. § 371 of International Patent Application No. PCT/EP2016/063128, filed Jun. 9, 2016 (pending), which claims the benefit of German Patent Application No. DE 10 2015 210 570.9 filed Jun. 9, 2015, the disclosures of which are incorporated by reference herein in their entirety.

TECHNICAL FIELD

The invention relates to a cable guide device for guiding at least one supply cable along a robot arm. The invention also relates to an associated industrial robot.

BACKGROUND

DE 10 2009 056 454 B4 discloses an energy supply device which is designed for industrial robots and which comprises a support component, an energy supply cable with a fixed cable section, a balancing section and an extractable section, a holder for attaching the fixed cable section to the support component, a guide for radially mounting the extractable cable section with respect to the support component and a reinforcement cross member, which connects the holder to the guide and is designed as a composite component together with the holder and the guide.

SUMMARY

The object of the present invention is to provide an improved cable guide device for a supply cable of an industrial robot.

This object is achieved in accordance with the invention by means of a cable guide device for guiding at least one supply cable along a robot arm, said cable guide device comprising:
  a supply cable,
  a spring system, which is designed to return the supply cable by means of a spring force automatically from an extracted state of the supply cable into a retracted state of the supply cable, and which has a front end section in the direction of extraction of the supply cable
  and a rear end section in the direction of extraction of the supply cable,
  a spring system seat, which is permanently connected to the supply cable and on which the rear end section of the spring system is mounted,
  an abutment seat, on which the front end section of the spring system is mounted,
  a fastening device that is designed to fasten the cable guide device to a link of the robot arm, and
  an adjustment device, which bears the abutment seat and which is designed to mount the abutment seat in a manner allowing movement with respect to the fastening device.

The robot arm may comprise a plurality of links that are connected by means of at least three joints.

The supply cable may comprise, for example, a protective hose, which encompasses one or more individual cables, which are designed to supply the robots and/or the tools, which they hold, with, for example, electric power, hydraulic fluid, oil, water and/or compressed air. Such a supply cable may be part of a so-called energy supply. The supply cable of the energy supply is generally drawn through a passage, in order to bring these cables into a desired position in the vicinity of the robot arm. The supply cable can be retracted again by means of a spring system, so that there are no sagging cables that interfere with the working area of the robot arm. Increased mobility in all spatial directions can be achieved by means of the cable guide device of the invention.

The spring system can be operated either actively or passively. In the case of a passive return of an extracted cable section, the spring system may have, for example, at least one spring helix, which in the retracted state of the supply cable is relaxed or is at least virtually relaxed and in the extracted state is under spring tension, so that in the absence of an external tensile force on the supply cable, the spring helix relaxes; and, in so doing, the supply cable is moved back into the retracted state. Preferably the spring system or, more specifically, the spring helix can be arranged parallel or coaxial to the supply cable. As a result, the change in the longitudinal extension of the spring system between the retracted state and the extracted state can occur in a direction parallel to the longitudinal extension of the supply cable. In particular, the supply cable is encompassed or surrounded or enveloped at least in certain regions by the spring system. As an alternative or in addition to a spring helix or a plurality of spring helixes, at least one pneumatic spring element may also be provided.

As an alternative, the spring system can be designed so as to be active. This means that the longitudinal extension of the spring system can be controlled or regulated by at least one actuator. Motors, pneumatic drives or hydraulic drives may be provided as an actuator. The at least one actuator can be controlled or regulated on the basis of a tensile stress applied to the supply cable. As an alternative or in addition, the actuator can also be controlled or regulated on basis of the pose of the robot. Thus, the position or, more specifically, the extraction of the supply cable can be actively controlled, in particular, by means of the robot controller, which also controls the movements of the robot.

The fastening device is provided to mount and/or to attach the cable guide device of the invention on and/or to a link of the robot arm or an add-on component that is connected to the robot arm. The robot arm or its add-on component carries the entire cable guide device by means of the fastening device. Thus, the fastening device may be accordingly a flange or a support member, which is to be screwed on and which is connected, in particular, is screwed tight to the link of the robot arm or the add-on component.

The adjustment device provides a mobility of the abutment seat with respect to that link of the robot arm or that add-on component, to which the fastening device flanges the cable guide device. The adjustment device may be, in particular, passively movable. In a preferred embodiment the adjustment device is designed to move or, more specifically, to adjust the abutment seat directly by means of that force that causes an extraction movement of the supply cable. As a result, the adjustment device may be moved at least largely or even completely by means of the transverse forces, which are generated transversely to the extraction direction, in particular, by means of a tensile force at the free end of the supply cable, for example, during rotation of the mounting flange of the industrial robot, to which the free end of the supply cable is fixed.

The rear end section of the spring system is mounted on the spring system seat, which is permanently connected to the supply cable. The spring system seat may be formed, for example, by a two-piece plastic ring having two half shell bodies, which are screwed to each other; and, thus, the plastic ring is fastened to a protective hose of the supply cable.

The spring system seat or, more specifically, the plastic ring may have a seat or stop, against which the end section of the spring system is braced. Such a bracing can be produced at least by fixing a spring helix of the spring system in the axial direction, i.e., in the opposite direction of the extraction direction. Thus, the rear end section of the spring system or, more specifically, the rear end section of the spring helix can be fixed with respect to the supply cable, in particular, with respect to the protective hose. Thus, the rear end section of the spring system or, more specifically, the rear end section of the spring helix can be mounted either rotatably about an axial axis with respect to the spring system seat or can be rigidly attached to the spring system seat. Instead of a spring system seat with a seat or a stop or, more specifically, instead of a plastic ring with a seat or stop, the spring system seat or, more specifically, the plastic ring may also be designed without a special seat or stop. For example, the spring system seat or, more specifically, the plastic ring may be designed as a protector, which is known to the person skilled in the art as such.

The front end section of the spring system is mounted on the abutment seat. The supply cable can be mounted in such a way that it can be extracted and retracted, thus, can be moved, in particular, together with the protective hose, through the abutment seat. For example, the abutment seat can be formed by a ball joint ring, which is mounted rigidly in a ball joint seat at least in the axial direction, but optionally can be mounted so as to pivot about a certain angle. However, the ball joint ring can also be connected to the ball joint seat in a completely rigid manner. However, the abutment seat and optionally also the ball joint seat are mounted in such a way that they are adjustable, in particular, resiliently adjustable, with respect to that link of the industrial robot, on which or to which the entire cable guide device is mounted or fastened.

The adjustment device may comprise a resetting device, which is designed to return the abutment seat from a deflected position of the abutment seat into a home position of the abutment seat; it is designed, in particular, to return the abutment seat by means of a spring force automatically from a deflected position of the abutment seat into a home position of the abutment seat.

The resetting device may have a spring constant that is greater than a spring constant of the spring system at least in the direction of extraction of the supply cable.

The resetting device or a separate spring member, or inherently a corrugated hose, may have a spring constant that is greater than a spring constant of the spring system or, more specifically, the spring helix at least in the direction of extraction of the supply cable. In the case of a corrugated hose or corrugated pipe, this corrugated hose or pipe may be designed in such a way that it is at least largely rigid in the direction of its axial extension, but at the same time may be designed to be flexible in a direction, perpendicular to its axial extension, or in the transverse direction.

The resetting device or the separate spring member, or inherently the corrugated hose, can be designed so as to be at least largely or completely rigid in the direction of extraction of the supply cable, whereas, in contrast, the resetting device can be designed, in particular, in an automatically resetting manner, such that it is movable, in particular, movable in a springy resilient manner, in at least one direction, perpendicular to the direction of extraction of the supply cable, or in the transverse direction.

The resetting device can be designed to be at least largely or completely rigid in the direction of extraction of the supply cable. An at least largely rigid design of the resetting device in the direction of its axial extension is characterized by the feature that the stiffness of the resetting device is at least greater than the stiffness, i.e., the spring constant of the spring helix, or the spring system in general, in the axial direction. Thus, the resetting device should be less resilient than the spring system or, more specifically, the spring helix in the axial direction.

The resetting device can be designed to be movable, in particular, movable in a springy resilient manner, in at least one direction perpendicular to the direction of extraction of the supply cable.

The adjustment device may be formed by a corrugated hose, which surrounds the spring system and which has a fixed corrugated hose end, which is connected to the fastening device, and a free corrugated hose end, which is opposite the fixed corrugated hose end and to which the abutment seat is fastened.

The corrugated hose can be designed to be at least largely rigid in the direction of its axial extension, but can be designed to be flexible in a direction perpendicular to its axial extension. An at least largely rigid design of the corrugated hose in the direction of its axial extension is characterized by the feature that the stiffness of the corrugated hose is at least greater than the stiffness, i.e., the spring constant of the spring helix, or the spring system in general, in the axial direction. Thus, the corrugated hose should be less resilient than the spring system or, more specifically, the spring helix in the axial direction.

By means of the adjustment device, in particular, by means of the corrugated hose, the abutment seat, which may comprise a ball joint ring and a ball joint seat, can be mounted so as to be movable with respect to the fastening device. Thus, the adjustment device can be moved at least largely or even completely by means of transverse forces, which occur transversely to the extraction direction, in particular, due to a tensile force at the free end of the supply cable, for example, upon rotation of the mounting flange of the industrial robot, to which the free end of the supply cable is fixed. In this case the adjustment device can be designed to pivot or to rotate, at least tendentially, the cable guide device, in particular, the spring system in the direction of the extraction direction. Not only can a movement of the adjustment device from a home position into a deflection position take place due to just these transverse forces alone, but a movement of the adjustment device from the deflection position into the home position can also occur due to just these transverse forces alone. As an alternative, a movement of the adjustment device from the deflection position into the home position may occur by means of a separate resetting force.

In order to generate such a resetting force, the resetting device may be provided in accordance with the invention. The resetting device can comprise, for example, a separate spring member, which is designed to return the abutment seat from a deflected position of the abutment seat into a home position of the abutment seat. As an alternative, for example, the corrugated hose of the adjustment device may be springy resilient, in order to return the abutment seat from a deflected position of the abutment seat into a home position of the abutment seat. Therefore, in this case the corrugated hose may be made of a material and/or have a shape, as a result of which the corrugated hose acquires an inherent resetting property, in particular, elasticity. The corrugated hose can be made, for example, of plastic or metal.

The spring system seat, which is permanently connected to the supply cable, can be guided adjustably inside the corrugated hose in the axial longitudinal extension of the corrugated hose.

For this purpose the spring system seat can have on its outer jacket a sliding surface, which is designed to slide along the inner jacket wall of the corrugated hose in the axial direction. Thus, when the supply cable is pulled out in the extraction direction, the spring system seat is moved from a rear position towards the front. In this respect the inner jacket wall of the corrugated hose forms a sliding guide for the spring system seat.

The resetting device can be formed by means of a flexible design of the corrugated hose.

The free corrugated hose end of the corrugated hose may be provided with a shock absorbing device on the outer circumference.

The shock absorbing device may be formed in one piece with the ball joint seat. In this case the shock absorbing device or the ball joint seat can be designed to protect the free corrugated hose end and/or the abutment seat against damage when upon a movement of the cable guide device, it strikes, for example, against a link of the industrial robot. To this end the shock absorbing device or the ball joint seat can be made of a flexible plastic. The shock absorbing device or the ball joint seat can be designed, in particular, for subsequent swapping or replacement.

In addition, the object of the present invention is also achieved by means of an industrial robot comprising a robot controller, which is designed and/or configured to execute a robot program; and comprising a robot arm with joints, which are automated according to the robot program or are automatically adjustable in a manual operating mode; and comprising at least one inventive cable guide device exhibiting one or more features of the cable guide device, as described.

In summary and also described in other words, it is provided according to the invention that a previously rigid section of the cable guide device is replaced by a movable, in particular, flexible section, preferably by an inherently flexible section. In the interior of this flexible section the hose package, i.e., the supply cable, which is customary in all cable guide devices, is stored and tracked. The flexible section is fastened to only one side of the robot arm, so that the free side, against which the hose package abuts, can also move at the same time with the movement of the robot arm along the robot arm without any additional guide means. Thus, the effective tracking distance of the cable guide device can be extended.

For example, the flexible element may be an outer corrugated pipe, similar to that contained in the hose package, only with a larger inside diameter. The inside diameter of the outer corrugated pipe has to be slightly larger than the largest outside diameter of the hose package, which is usually determined by means of the springs or the spring holders. The outer corrugated pipe may be made of a flexible, but strong material, so that a lateral movement, i.e., transversely to the longitudinal direction, in particular, bending or pivoting, is possible. However, at the same time stretching under a tensile force should be possible only to a very small degree. The outer corrugated pipe is permanently mounted on the rear side of the robot arm and is free on the front side. The inner hose package is guided in a shaped part, sitting on the outer corrugated pipe, at the front side of the outer corrugated pipe, in such a way that the inner corrugated pipe remains freely movable. However, the springs, located around the inner corrugated pipe, are braced in such a way that they can build up a counter-force over a spring holder, which sits securely on the internal corrugated pipe, when the hose package is pulled forward out of the outer corrugated pipe. In order to protect the moving front side of the outer corrugated pipe, a type of protector, in particular, a rotatable protector, i.e., a shock absorbing device, may be provided that is made preferably of a wear-resistant material.

However, the corrugated pipe may also be a similar flexible and longitudinal element having an interior space, which is available for the hose package and which has a length that hardly changes under tension in the longitudinal direction, but in the lateral direction can be deformed by means of a force, which acts on the free end transversely to the longitudinal direction, at a ratio of, for example, 5:1 to 20:1 for the quotient of bending radius to outer diameter.

When the previously rigid section of the cable guide device tracks the movement of the robot arm, then the result is a longer effective tracking distance. As an alternative, the cable guide device can be designed structurally smaller, while the tracking distance remains the same, and, thus, may be lighter and more cost effective.

BRIEF DESCRIPTION OF THE DRAWINGS

Specific exemplary embodiments of the invention are explained in greater detail in the following description with reference to the accompanying figures. Specific features of these exemplary embodiments may represent, when viewed, where appropriate, individually or in other combinations, general features of the invention, irrespective of the specific context, in which they are mentioned.

DETAILED DESCRIPTION

Figure 1:
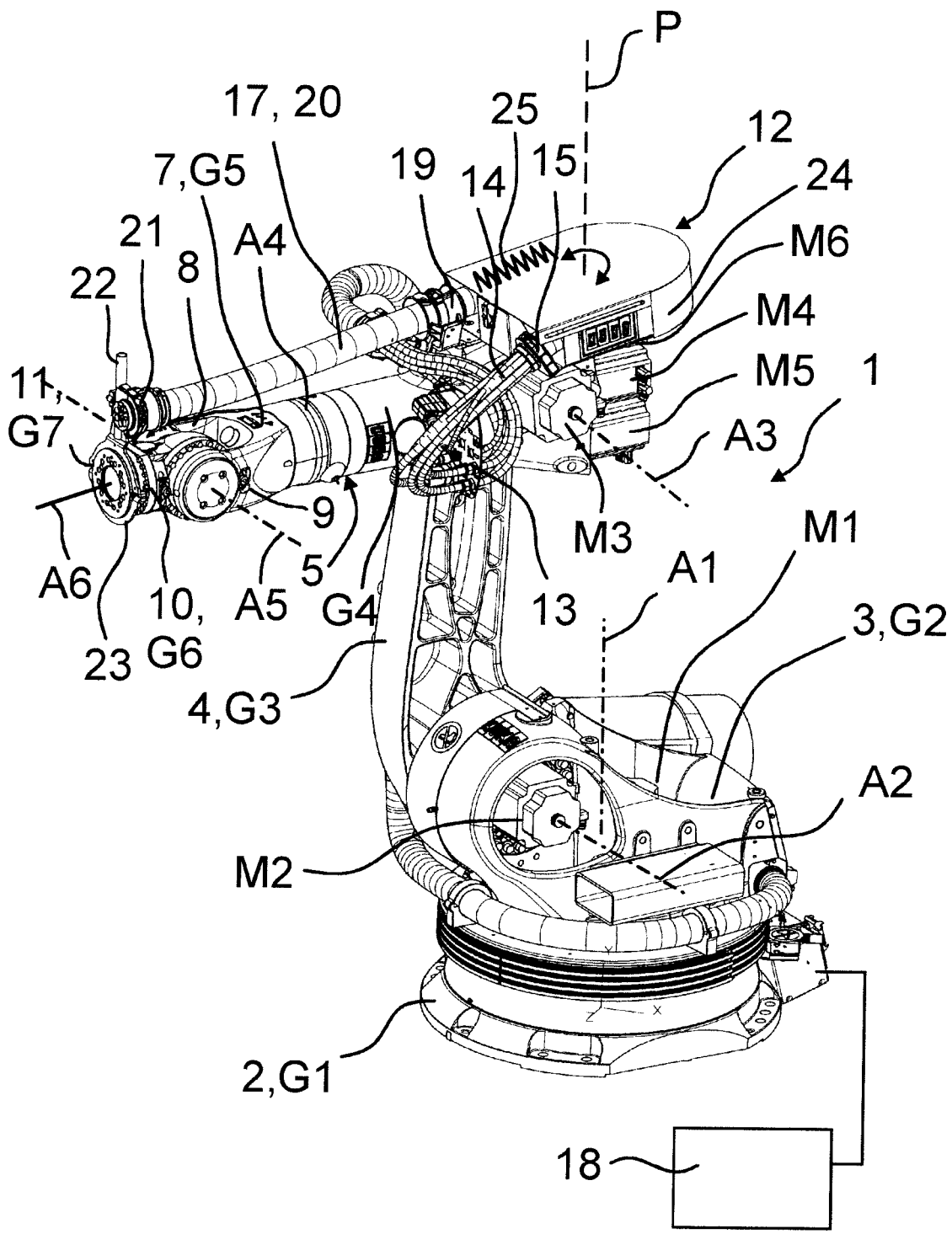
FIG. 1 is a perspective view of an industrial robot with a cable guide device of the invention for a supply cable of the industrial robot.

FIG. 1 shows an industrial robot 1 comprising a base frame 2 as a first link G1, on which a carousel 3 is mounted as the second link G2 in a manner allowing rotation about a first vertical axis A1; and said first link is driven in rotation by means of a first drive motor M1. The axes A1-A6 of the industrial robot 1 can also be referred to as the joints A1-A6, among other things. A link arm 4 is mounted on the carousel 3 as a third link G3 in such a way that it can be pivoted up and down about a second horizontal axis A2 and is driven in rotation by means of a second drive motor M2. The link arm 4 bears a robot arm 5, which is mounted in a manner allowing pivoting up and down about a third horizontal axis A3 and is driven in rotation by means of a third drive motor M3. On the robot arm 5, the base arm of which forms a fourth link G4, there is provided a fourth axis A4, which extends in the longitudinal extension of the robot arm 5, and which drives in rotation by means of a fourth drive motor M4 a hand 7, which forms a forearm of the robot arm 5 and represents a fifth link G5. Starting from the hand 7, a first leg 8 and a second leg 9 extend in a fork-like manner towards the front. The two legs 8 and 9 carry a bearing arrangement for a free end 10 of the hand 7, which forms a sixth link G6. The bearing arrangement defines a fifth axis A5 of the industrial robot 1, about which the hand 7 can be pivotally moved by means of a fifth drive motor M5. In addition, the hand 7 comprises a sixth axis A6, in order to be able to drive rotatably a mounting flange 11, which forms a seventh link G7, by means of a sixth drive motor M6.

The robot arm 5 carries a cable guide device 12. The cable guide device 12 starts behind a connecting plate 13, which is permanently connected to the robot arm 5 of the industrial robot 1. The individual cables 14 run from the connecting plate 13 to a clamping strap 15. The clamping strap 15 securely clamps the individual cables 14 and fixes them in a fixed position with respect to the cable guide device 12. One section of a cable strand of a supply cable 17 is guided spring-biased in a U shape in a housing 24 of the cable guide device 12. In the U-shaped section and on the outlet side of a holding device 19, the individual cables 14 are combined to form a common supply cable 17, in particular, surrounded by a protective hose 20. The protective hose 20 terminates at a clamp 21, which is held at a distance from the robot arm 5 by means of a hose holder 22. The hose holder 22 is fastened by means of a two-piece clamp 23 to the mounting flange 11 of the industrial robot 1.

In a first exemplary embodiment, as shown in FIG. 1, the supply cable 17 can be moved by means of a spring system 25, which in this case is shown only symbolically and which is disposed inside the housing 24. In this embodiment the housing 24 can be freely pivoted back and forth about an axis of rotation, which is indicated by the arrow P, in order to form an adjustment device according to the invention. At the same time the abutment seat is formed by the holding device 19. In this case a fastening device of the invention is formed by a base of a pivot joint, which mounts the housing 24 on the robot arm, in particular, on the fourth link G4 in such a way that said housing can be pivoted back and forth (arrow P).

Figure 2:
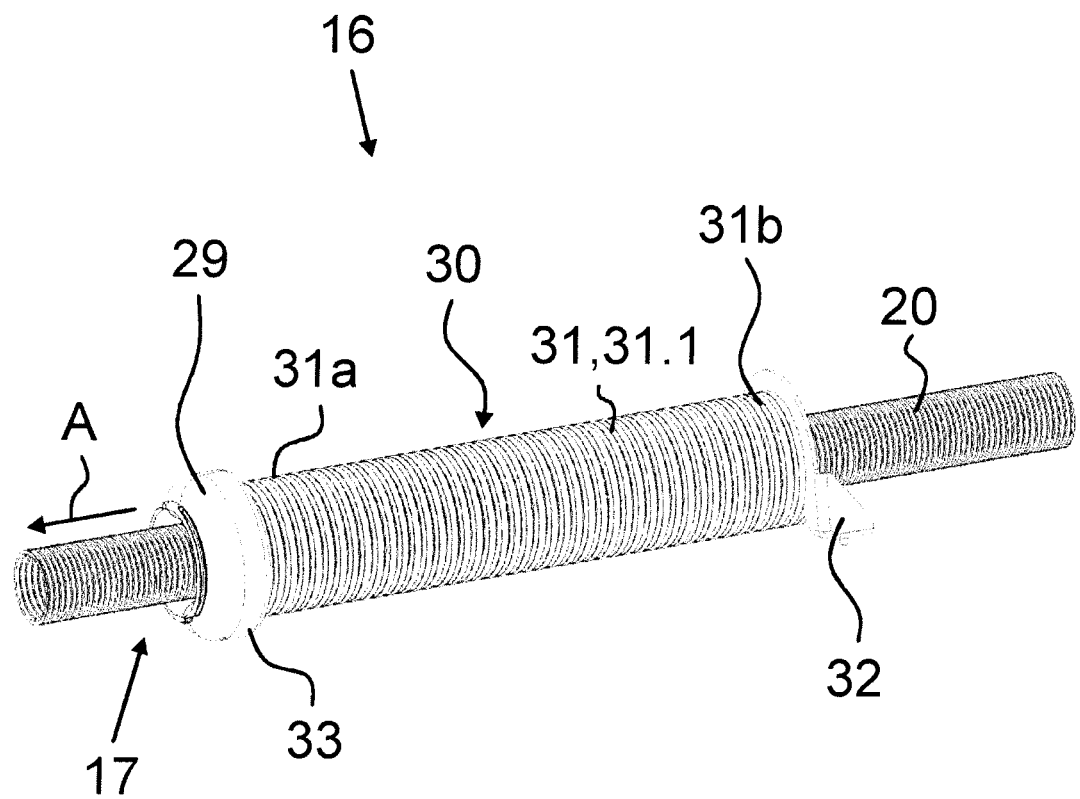
FIG. 2 is a perspective view of an alternative embodiment of an inventive cable guide device in isolation.
Figure 3:
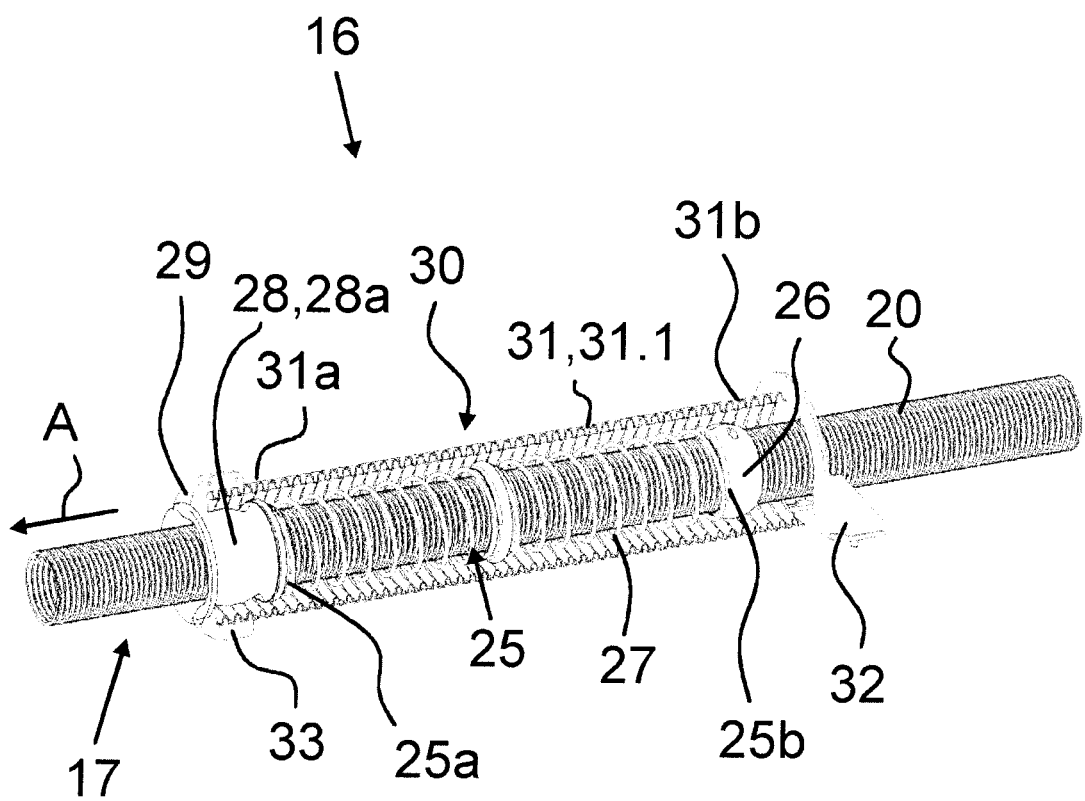
FIG. 3 is a perspective view of the cable guide device from FIG. 2 in a cutaway view.
Figure 4:
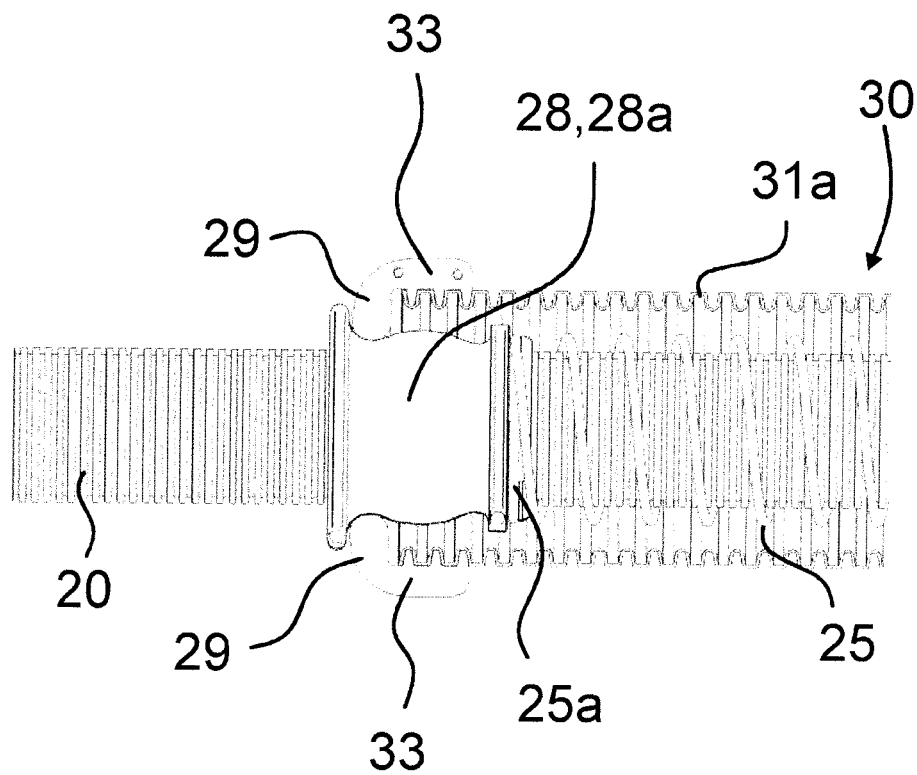
FIG. 4 is a part of a cross sectional view through the front end section of a spring system of the inventive cable guide device from FIG. 2.

FIGS. 2 to 4 show an alternative variant of the embodiment. This cable guide device 16 comprises the supply cable 17. In this case the spring system 25 is designed to return the supply cable 17 automatically by means of a spring force from an extracted state of the supply cable 17 into a retracted state of the supply cable 17; and said spring system has a front end section 25a in the direction of extraction A of the supply cable 17 and a rear end section 25b in the direction of extraction of the supply cable 17.

The rear end section 25b of the spring system 25 is mounted on a spring system seat 26, which is permanently connected to the supply cable 17. In the case of the present exemplary embodiment the spring system seat 26 is formed by a two-piece plastic ring, which comprises two half-shell bodies, which are screwed to each other; and, as a result, the plastic ring is fastened to a protective hose 20 of the supply cable 17. The spring system seat 26 or, more specifically, the plastic ring has a seat or stop, against which the end section 25b of the spring system 25 is braced. Such a bracing is produced at least by fixing a spring helix 27 of the spring system 25 in the axial direction, i.e., counter to the direction of extraction A. Thus, the rear end section 25b of the spring system 25 or, more specifically, the rear end section of the spring helix 27 is fixed with respect to the supply cable 17, in particular, with respect to the protective hose 20. Thus, the rear end section 25b of the spring system 25 or, more specifically, the rear end section of the spring helix 27 can be mounted either rotatably about an axial axis with respect to the spring system seat 26 or can be rigidly attached to the spring system seat 26.

The front end section 25a of the spring system 25 is mounted on an abutment seat 28. The supply cable 17 is mounted in such a way that it can be extracted and retracted, thus, moved, in particular, together with the protective hose 20, through the abutment seat 28. In the case of the present exemplary embodiment, the abutment seat 28 is formed by a ball joint ring 28a, which is mounted rigidly in a ball joint seat 29 at least in the axial direction, but optionally is mounted pivotally about a certain angle. However, the ball joint ring 28a can also be connected to the ball joint seat 29 in a completely rigid manner. However, according to the invention, the abutment seat 28, in particular, in the case of the present exemplary embodiment, the ball joint ring 28a and the ball joint seat 29 are mounted in such a way that they are adjustable, in particular, resiliently adjustable, with respect to that link G1-G7 of the industrial robot 1, for example, link G4, on which or to which the entire cable guide device 16 is mounted or fastened.

Therefore, in the case of the present exemplary embodiment, an adjustment device 30 of the invention is formed by a corrugated hose 31, which surrounds the spring system 25 and which has a fixed corrugated hose end 31b, which is connected to a fastening device 32, and a free corrugated hose end 31a, which is opposite the fixed corrugated hose end 31b and to which the abutment seat 28 is fastened, or the ball joint ring 28a and the ball joint seat 29 are fastened. The corrugated hose 31 is designed to be at least largely rigid in the direction of its axial extension, but is designed to be flexible in a direction perpendicular to its axial extension. An at least largely rigid design of the corrugated hose 31 in the direction of its axial extension is characterized by the feature that the stiffness of the corrugated hose 31 is at least greater than the stiffness, i.e., the spring constant of the spring helix 27, or the spring system 25 in general, in the axial direction. Thus, the corrugated hose 31 should be less resilient than the spring system 25 or, more specifically, the spring helix 27 in the axial direction.

The fastening device 32 is designed to fasten the cable guide device 16 to a link G1-G7 of the robot arm 5, in particular, to the link G4.

By means of the adjustment device 30, in particular, by means of the corrugated hose 31, the abutment seat 28 is or the ball joint ring 28a and a ball joint seat 29 are mounted so as to be movable with respect to the fastening device 32. Thus, the adjustment device 30 is moved at least largely or even completely by means of transverse forces, which occur transversely to the extraction direction A, in particular, due to a tensile force at the free end of the supply cable 17, for example, upon rotation of the mounting flange 11 of the industrial robot 1, to which the free end of the supply cable 17 is fixed. In this case the adjustment device 30 is designed to pivot or to rotate, at least tendentially, the cable guide device 16, in particular, the spring system 25 in the direction of the extraction direction A. Not only can a movement of the adjustment device 30 from a home position into a deflection position take place due to just these transverse forces alone, but a movement of the adjustment device 30 from the deflection position into the home position can also take place due to just these transverse forces alone. As an alternative, a movement of the adjustment device 30 from the deflection position into the home position may take place by means of a separate resetting force. In order to generate such a resetting force, a resetting device 31.1 may be provided in accordance with the invention. The resetting device 31.1 can comprise, for example, a separate spring member, which is designed to return the abutment seat 28 from a deflected position of the abutment seat 28 into a home position of the abutment seat 28. As an alternative, for example, the corrugated hose 31 of the adjustment device 30 may be springy resilient, in order to return the abutment seat 28 from a deflected position of the abutment seat 28 into a home position of the abutment seat 28. Therefore, in this case the corrugated hose 31 may be made of a material and/or have a shape, as a result of which the corrugated hose 31 acquires an inherent resetting property, in particular, elasticity. The corrugated hose 31 can be made, for example, of plastic or metal.

The resetting device 31.1 or the separate spring member, or inherently the corrugated hose 31, may have a spring constant that is greater than a spring constant of the spring system 25 or, more specifically, the spring helix 27 at least in the direction of extraction of the supply cable 17. Therefore, the corrugated hose 31 should be designed in such a way that it is at least largely rigid in the direction of its axial extension, but at the same time should be designed to be flexible in a direction, perpendicular to its axial extension, or in the transverse direction.

In this case the resetting device 31.1 or the separate spring member, or inherently the corrugated hose 31, should be designed in such a way that it is at least largely or completely rigid in the direction of extraction A of the supply cable 17, whereas, in contrast, the resetting device 31.1 should be designed in such a way that it is movable, in particular, movable in a springy resilient manner, in at least one direction, perpendicular to the extraction direction A of the supply cable 17, or in the transverse direction.

The spring system seat 26, which is permanently connected to the supply cable 19, is guided in the axial longitudinal extension, i.e., in the extraction direction A, coaxially to the corrugated hose 31, in such a way that it is adjustable inside the corrugated hose 31. For this purpose the spring system seat 26 can have on its outer jacket a sliding surface, which is designed to slide along the inner jacket wall of the corrugated hose 31 in the axial direction. Thus, when the supply cable 19 is pulled out in the extraction direction A, the spring system seat 26 is moved from a rear position, shown in FIG. 3, towards the front. In this respect the inner jacket wall of the corrugated hose 31 forms a sliding guide for the spring system seat 26.

In the case of the exemplary embodiment of the cable guide device 16, shown in FIGS. 2 to 4, the resetting device 31.1 is formed by means of a flexible design of the corrugated hose 31.

In the case of the present exemplary embodiment the free corrugated hose end 31a of the corrugated hose 31 is provided with a shock absorbing device 33 on the outer circumference. In this case the shock absorbing device 33 is formed in one piece with the ball joint seat 29. In this case the shock absorbing device 33 or the ball joint seat 29 can be designed to protect the free corrugated hose end 31a and/or the abutment seat 28 against damage, when upon a movement of the cable guide device 16, it strikes, for example, against a link G1-G7 of the industrial robot 1. To this end the shock absorbing device 33 or the ball joint seat 29 can be made of a flexible plastic. The shock absorbing device 33 or the ball joint seat 29 can be designed, in particular, for subsequent swapping or replacement.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A cable guide device for guiding at least one supply cable along a robot arm, the cable guide device comprising:
   a supply cable;
   a spring system configured to automatically return the supply cable by a spring force from an extended state of the supply cable to a retracted state of the supply cable, the spring system including a front end section in a direction of extension of the supply cable, and a rear end section spaced from the front end section in the direction opposite the direction of extension;
   a spring system seat permanently connected to the supply cable and on which the rear end section of the spring system is mounted;
   an abutment seat on which the front end section of the spring system is mounted;
   a fastening device configured to fasten the cable guide device to a link of the robot arm; and
   an adjustment device which carries the abutment seat and which is configured to movably mount the abutment seat relative to the fastening device.

2. The cable guide device of claim 1, wherein the adjustment device comprises a resetting device operable to return the abutment seat from a deflected position of the abutment seat into a home position of the abutment seat.

3. The cable guide device of claim 2, wherein the resetting device automatically returns the abutment seat from the deflected position to the home position by a spring force.

4. The cable guide device of claim 2, wherein the resetting device has a spring constant that is greater than a spring constant of the spring system, at least in the extension direction of the supply cable.

5. The cable guide device of claim 4, wherein the resetting device is substantially or completely rigid in the extension direction of the supply cable.

6. The cable guide device of claim 4, wherein the resetting device is movable in at least one direction perpendicular to the extension direction of the supply cable.

7. The cable guide device of claim 2, wherein the resetting device is resiliently movable in the at least one direction perpendicular to the extension direction.

8. The cable guide device of claim 1, wherein the adjustment device comprises a corrugated hose which surrounds the spring system and which has a first, fixed corrugated hose end connected to the fastening device, and a second, free corrugated hose end opposite the first, fixed corrugated hose end and fastened to the abutment seat.

9. The cable guide device of claim 8, wherein the spring system seat is adjustably guided inside the corrugated hose in an axial longitudinal direction of the corrugated hose.

10. The cable guide device of claim 8, wherein the resetting device operates by a resiliency of the corrugated hose.

11. The cable guide device of claim 8, further comprising a shock absorbing device on an outer circumference of the first, free corrugated hose end.

12. An industrial robot, comprising:
a robot controller configured to execute a robot program;
a robot arm including a plurality of joints which are automated according to the robot program, or that are automatically adjustable in a manual operating mode of the industrial robot; and
at least one cable guide device according to claim 1.

* * * * *